Sept. 3, 1957 C. H. PICKARD 2,804,913
VENTILATED SEAT COVER
Filed Nov. 23, 1955
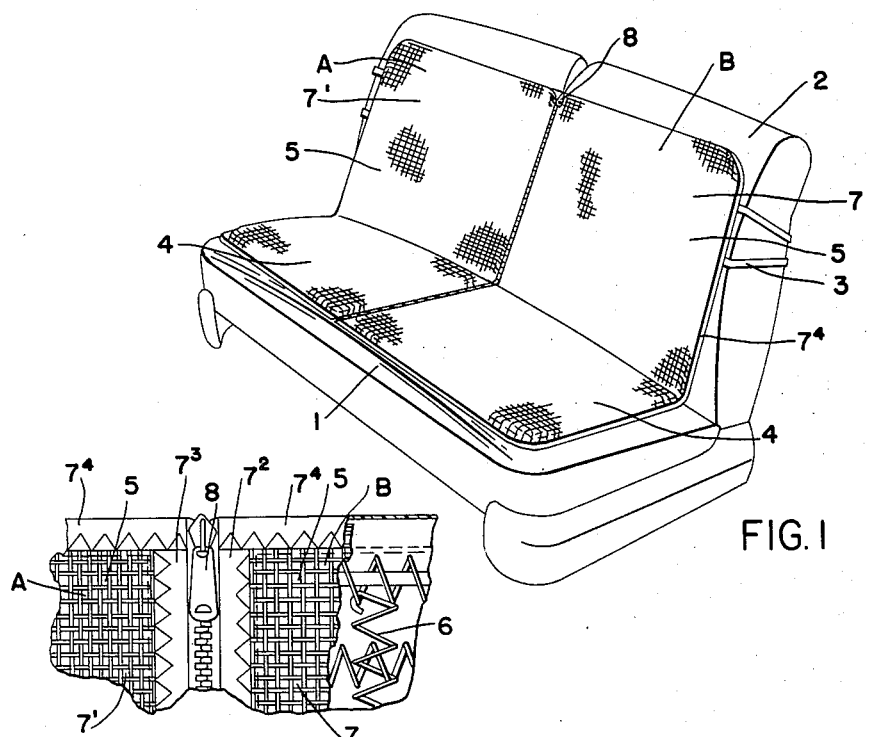
FIG. 1
FIG. 3
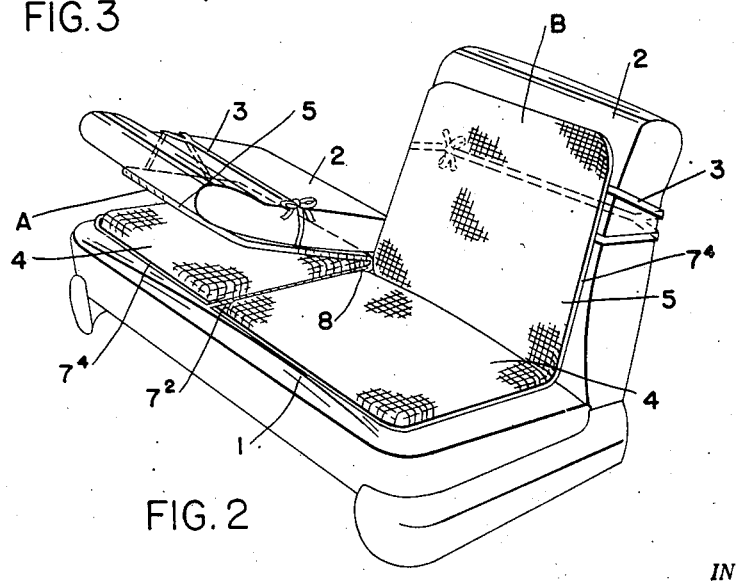
FIG. 2
INVENTOR.
CLESSON H. PICKARD
BY
George W. Saywell
ATTORNEY

2,804,913
VENTILATED SEAT COVER

Clesson H. Pickard, Fremont, Ohio, assignor to The S. E. Hyman Company, Fremont, Ohio, a corporation of Ohio Application November 23, 1955, Serial No. 548,633

1 Claim. (Cl. 155—182)

The invention relates to ventilated seat covers, and particularly to devices of this character usable as cushions for the seats and back rests of automobiles.

The purpose of the invention is the provision of a device of this character which will be comfortable to the user from the viewpoints of accommodation to the body of the user and free circulation of air through the cover; as also, particularly a seat cover one-half of which can be conveniently used for one automobile seat, or can be used as a whole for complete coverage of a double seat, whether the automobile doors are those of a two-door car or a four-door car.

It will be appreciated that oftentimes a cover for only one complete seat and its back rest is desired; that at other times a complete cover is desired for either or both of the two front seats and the rear seats of a two-door car; and that oftentimes two-seat covers would be used for a four-door car.

In the event a complete cover is desired for both front seats of a two-door car, it is necessary to turn down one of the back rests, usually the right-hand passenger's back rest, in order to permit passengers to obtain access to the rear seats of a two-door car.

The invention presented is designed to be conveniently adaptable for these various uses.

The annexed drawing and the following description disclose a preferred form of the invention, such disclosure presenting, however, only one of the various forms in which its principle might be embodied.

In said annexed drawing:

Figure 1 is a perspective view of two side-by-side seats of an automobile showing the improved cover applied to both seats;

Figure 2 is a perspective view, similar to Figure 1, but showing the back rest of a right-hand seat of a front two-seat formation bent forwardly to permit access to the rear seat formation of a car having only two doors; and Figure 3 is a fragmentary elevation of the back rests of a seat cover, with parts broken away to disclose the underlying skeletonized spring platform frames forming the interior bodies of the back rest halves of the cover, the view also disclosing a slide fastener secured to adjacent portions of these back rest cover parts, which slide fastener extends throughout the depth of the cover so that the part of the cover which is designed for use with the seat and back rest of one seat can be partially or entirely detached from the other cover part having a back rest and seat for the adjacent side-by-side seat.

Referring to the annexed drawing in which the same parts of the improved cover are indicated by the same respective characters in the several views, the improved cover is shown as comprising two similar cover parts, A for a right-hand seat, and B for a side-by-side left-hand seat. These right-hand and left-hand cover parts are similar and may be either for the complete coverage of the side-by-side front seats or the side-by-side rear seats of an automobile, and each includes a cover portion 4 for an automobile seat 1 and a cover portion 5 for a back rest 2 of the seat 1. Secured to the rear face of the back rest portion 5 is a strap 3 or any other suitable securing means, by which the back rest cover portion 5 is held snugly against the seat back rest 2.

The interior body of each member of the cover halves is formed of a skeletonized spring platform frame 6 which provides resiliency and ventilation between the front and back faces of the cover, no claim being made in this application to the particular structure of said interior body frame other than that it is air-pervious and resilient. The seat portion and the back rest portion of each of the two cover halfs A and B are each provided with one of the skeletonized inner spring platform frames 6.

The seat portion and the back rest portion of each of the cover parts A and B are flexibly connected together whereby the back rest portion can be turned down on the seat portion as is shown in Figure 2 and as will be hereinafter more fully referred to.

There are front and back face members for the cover parts A and B and they are formed of reticulated fabric that serves as a ventilated housing or envelope for the skeletonized spring platform frame 6, one housing being sufficient for two side-by-side seats, if it is desired to use the two similar cover parts A and B to form a complete cover for two seats. However, one of the purposes of the invention is to provide for a separation of the cover parts A and B, if it is desired to use only one part for one seat or it is desired to fold one back rest forwardly, as shown in Figure 2, for passenger access to the rear seat of a two-door car having front and back seats. For this purpose, the housing is divided into two parts, Figure 1, 7 on the left-hand side and 7' on the right-hand side. Each of these two parts 7 and 7' has an inner edge extension $7^2$ and $7^3$, respectively, which extensions are adjacent one to the other, Figure 3, and are connected together by a slide fastener 8. This slide fastener extends throughout the entire depth of the cover from its top edge to its bottom edge so that the two housing parts 7 and 7' with their spring body fillers can be entirely separated one from the other whereby one part of the cover, either A or B, can be utilized. However, if it is desired only to turn a seat back rest forwardly for passenger access to a two-door car having rear seats, as shown in Figure 2, the slide fastener parts are loosened from the top downwardly only so far as is necessary to permit the back rest 2 with its seat cover member 5 to be turned down as shown in Figure 2.

The front and rear face members of the housing 7 and housing 7' for the cover parts A and B are formed with peripheral hems $7^4$ which are comprised of stitched overlapping edges of the front and rear faces of the housings 7 and 7'.

What I claim is:

A ventilated seat cover comprising two similar cover parts positioned in side-by-side relation, each cover part comprising a seat member and a back rest member flexibly connected together, the members of each cover part each having an inner skeletonized spring frame platform, a reticulated fabric housing enclosing both faces of the frames of each cover part, each housing having a flexible extension coextensive with the seat and back rest members of each cover part at the edge of the latter, a slidable fastener carried by the adjacent edges of said flexible extensions throughout the depth thereof, whereby the two cover parts can be utilized in completely attached condition, or the two cover parts can be wholly detached one from the other, or can be detached one from the other throughout any desired extent of the cover part depth.

References Cited in the file of this patent
UNITED STATES PATENTS 2,051,494   Mitchell et al. _____ Aug. 18, 1936